(12) United States Patent
Yamaguchi et al.

(10) Patent No.: US 7,407,193 B2
(45) Date of Patent: Aug. 5, 2008

(54) SEAT BELT BUCKLE

(75) Inventors: Yutaka Yamaguchi, Hikone (JP);
Yoshiyuki Nakano, Hikone (JP);
Hiroshi Tomita, Omihachiman (JP);
Tadayuki Asako, Shiga (JP); Toshiyuki Konishi, Shiga (JP)

(73) Assignee: Takata Corporation, Tokyo (JP)

( * ) Notice: Subject to any disclaimer, the term of this patent is extended or adjusted under 35 U.S.C. 154(b) by 510 days.

(21) Appl. No.: 11/081,933

(22) Filed: Mar. 17, 2005

(65) Prior Publication Data

US 2005/0206150 A1 Sep. 22, 2005

(30) Foreign Application Priority Data

| Mar. 18, 2004 | (JP) | ............................... 2004-078751 |
| Apr. 26, 2004 | (JP) | ............................... 2004-129337 |
| Jan. 11, 2005 | (JP) | ............................... 2005-003530 |

(51) Int. Cl.
*B60R 22/28* (2006.01)

(52) U.S. Cl. .................... 280/805; 280/801.1; 297/468; 297/470

(58) Field of Classification Search .............. 280/801.1, 280/801.2, 808, 805; 297/468, 469, 481, 297/470
See application file for complete search history.

(56) References Cited

U.S. PATENT DOCUMENTS

| 5,064,220 | A | * | 11/1991 | Ogawa | ..................... 280/801.1 |
| 5,219,206 | A | | 6/1993 | Anthony et al. | |
| 5,219,207 | A | | 6/1993 | Anthony et al. | |
| 5,233,732 | A | | 8/1993 | Yamanishi | |
| 5,280,958 | A | | 1/1994 | Chung | |
| 5,332,261 | A | * | 7/1994 | Siepierski | ................ 280/801.1 |
| 5,359,756 | A | | 11/1994 | Miyauchi et al. | |
| 6,485,058 | B1 | * | 11/2002 | Kohlndorfer et al. | ........ 280/808 |
| 6,581,969 | B2 | | 6/2003 | Nishide | |
| 6,669,234 | B2 | | 12/2003 | Kohlndorfer et al. | |
| 6,883,834 | B2 | | 4/2005 | Grabowski et al. | |
| 2002/0167212 | A1 | * | 11/2002 | Rogers et al. | ............... 297/468 |

FOREIGN PATENT DOCUMENTS

| JP | 61-21304 | 1/1986 |
| JP | 63-21170 | 1/1988 |
| JP | 63-21171 | 1/1988 |
| JP | 63-176856 | 7/1988 |
| JP | 64-44864 | 2/1989 |
| JP | 1-109469 | 4/1989 |
| JP | 2-108641 | 4/1990 |
| JP | 3-2206 | 1/1991 |
| JP | 3-8044 | 1/1991 |
| JP | 3-20216 | 1/1991 |

(Continued)

*Primary Examiner*—Eric Culbreth
*Assistant Examiner*—Barry Gooden, Jr.
(74) *Attorney, Agent, or Firm*—Foley & Lardner LLP

(57) ABSTRACT

A buckle device that includes a buckle with which a tongue supported by a seat belt becomes engaged, and buckle-moving device which moves the buckle between a storage position at which the buckle is stored when the buckle is not used and a use position at which the buckle is retained in a used state in which the seat belt is fastened. The buckle may be hidden in the vehicle seat at the storage position. The buckle does not obstruct the occupant when the occupant sits on or gets off the vehicle seat, and the occupant can smoothly sit on or get off the vehicle seat.

5 Claims, 12 Drawing Sheets

FOREIGN PATENT DOCUMENTS

| | | |
|---|---|---|
| JP | 4-92463 | 3/1992 |
| JP | 5-14927 | 1/1993 |
| JP | 5-28764 | 2/1993 |
| JP | 7-267046 A | 10/1995 |
| JP | 08058527 A | 3/1996 |
| JP | 2001163177 A | 6/2001 |
| JP | 2002145010 A | 5/2002 |
| JP | 2005-263069 | 9/2005 |
| WO | WO 02/087931 A1 | 11/2002 |

* cited by examiner

SEAT BELT BUCKLE

The present invention relates to seat belt apparatuses installed in vehicles, such as automobiles, for protecting occupants with seat belts, and more specifically to a buckle device including a buckle with which a tongue supported by a seat belt becomes engaged and a seat belt apparatus using the buckle device.

BACKGROUND

In a typical seat belt apparatus attached to a seat of a vehicle, such as an automobile, a seat belt restrains an occupant in case of emergency, for example, when a large deceleration is caused by collision or the like. Thus, the occupant is prevented from being ejected from the seat and is protected.

On the other hand, a seat belt apparatus for a rear seat of a vehicle generally includes a buckle which is placed on a seat cushion when the seat belt apparatus is not used. Therefore, when an occupant gets into the vehicle and tries to sit on the rear seat, the occupant is obstructed by the buckle placed on the seat cushion and cannot smoothly sit on the rear seat. Similarly, when the occupant tries to get off the rear seat and out of the vehicle, the buckle clings to the occupant's body and the occupant cannot smoothly get off the seat and out of the vehicle. In addition, since the buckle is left on the seat cushion, the appearance of the vehicle is degraded when the buckle is not used.

Accordingly, a seat-belt-storing apparatus has been suggested in which a buckle is stored in a buckle-storing section provided in a seat cushion of a vehicle seat when the buckle is not used, and is taken out from the buckle-storing section by an occupant when the buckle is used. An example of such an apparatus is disclosed in Japanese Examined Utility Model Registration Application Publication No. 3-20216.

In the seat-belt-storing apparatus disclosed in Japanese Examined Utility Model Registration Application Publication No. 3-20216, the buckle is not placed on the seat cushion while the seat belt apparatus is not used. Therefore, the occupant can sit on or get off the seat without being obstructed by the buckle, and the appearance of the vehicle is improved.

However, in the seat-belt-storing apparatus disclosed in Japanese Examined Utility Model Registration Application Publication No. 3-20216, the occupant must take the buckle out of the buckle-storing section each time the occupant sits on the vehicle seat and fastens the seat belt. Thus, the occupant must perform a cumbersome task to fasten the seat belt. In addition, in order to ensure the seat function of the seat cushion, the size of the buckle-storing section is limited and remains very small. Therefore, it is difficult to take the buckle out of the small buckle-storing section, and this makes the task to fasten the seat belt more cumbersome.

In view of the above-described situation, an object of the present invention is to provide a buckle device which allows an occupant to smoothly sit on and get off a vehicle seat and with which a seat belt can be easily fastened, and to provide a seat belt apparatus using the buckle device.

SUMMARY OF THE INVENTION

In order to attain the above-described object, according to an embodiment of the present invention, a buckle device includes a buckle with which a tongue supported by a seat belt becomes engaged, and buckle-moving device which moves the buckle between a storage position at which the buckle is stored when the buckle is not used and a use position at which the buckle is retained in a used state in which the seat belt is fastened.

In a further embodiment of the present invention, the buckle is hidden in a vehicle seat at the storage position, and projects out from the vehicle seat at the use position.

In a further embodiment of the present invention, the buckle is moved between the storage position and the use position with a rotational movement or a linear movement by the buckle-moving device.

In an embodiment of the present invention, the buckle is moved between the storage position and the use position with a rotational movement by the buckle-moving device, and the buckle device further includes a buckle-supporting lever for supporting the buckle and having an external-force-reducing mechanism which reduces an external force applied to the buckle-supporting lever if the external force is larger than a predetermined force.

In an embodiment of the present invention, a buckle device includes a buckle with which a tongue supported by a seat belt becomes engaged and buckle-moving device which moves the buckle between a storage position at which the buckle is stored when the buckle is not used, an attachment position at which the tongue becomes engaged with the buckle to fasten the seatbelt, and a use position at which the buckle is retained in a used state in which the seat belt is fastened.

In a further embodiment of the present invention, the buckle is hidden in a vehicle seat at the storage position, and projects out from the vehicle seat at least at the attachment position.

In a further embodiment of the present invention, the buckle is moved between the storage position, the attachment position, and the use position with a rotational movement or a linear movement by the buckle-moving device.

In an embodiment of the present invention, the buckle is moved between the storage position, the attachment position, and the use position with a rotational movement by the buckle-moving device, and the buckle device further comprises a buckle-supporting lever for supporting the buckle and having an external-force-reducing mechanism which reduces an external force applied to the buckle-supporting lever if the external force is larger than a predetermined force.

In an embodiment of the present invention, the buckle-moving device includes a motor. In a further embodiment of the present invention, the motor is driven so as to move the buckle from the storage position to the use position when a withdrawal of the seat belt or a state in which an occupant is sitting on the vehicle seat is detected. In another embodiment of the present invention, the motor is driven so as to move the buckle from the use position to the storage position when a separation of the tongue from the buckle is detected.

In an embodiment of the present invention, a seat belt apparatus includes a seat belt to be worn by an occupant, a tongue movably supported by the seat belt, and a buckle according to one of the present embodiments for a buckle device described above, with the tongue becoming engaged with the buckle to fasten the seatbelt.

According to an embodiment of the present invention, the buckle-moving device may automatically move the buckle to the storage position when the buckle is not used, and to the use position when the buckle is used. Therefore, the buckle does not obstruct the occupant when the occupant sits on or gets off the vehicle seat, and the occupant can smoothly sit on or get off the vehicle seat. In addition, since the buckle is automatically moved to the use position when the buckle is used, it is not necessary for the occupant to take out the buckle, unlike the apparatus disclosed in Japanese Examined Utility Model Registration Application Publication No. 3-20216. Accordingly, the occupant can easily fasten the seat belt. In addition, it is not necessary to increase the size of a buckle-storing section, and therefore the seat function of the vehicle seat is ensured.

According to an embodiment of the present invention, the buckle-moving device may automatically move the buckle to the storage position when the buckle is not used, to the attachment position when the seat belt is fastened, and to the use position when the buckle is used. Therefore, the buckle does not obstruct the occupant when the occupant sits on or gets off the vehicle seat, and the occupant can smoothly sit on or get off the vehicle seat. In addition, since the buckle is at the attachment position when the seat belt is fastened, it is not necessary for the occupant to take out the buckle, unlike the apparatus disclosed in Japanese Examined Utility Model Registration Application Publication No. 3-20216, and the tongue can be easily inserted into the buckle. Accordingly, the occupant can easily fasten the seat belt. In addition, it is not necessary to increase the size of a buckle-storing section, and therefore the seat function of the vehicle seat is ensured. Because the buckle is at the use position when the buckle is used, the seat belt reliably serves the function of restraining the occupant.

According to an embodiment of the present invention, the buckle may be hidden in the vehicle seat at the storage position. Therefore, the appearance of the vehicle is improved when the buckle is not used, and dust and foreign bodies are prevented from entering the buckle.

According to an embodiment of the present invention, the buckle may be moved between the storage position and the use position or between the storage position and the attachment position with a rotational movement or a linear movement. Accordingly, the buckle is moved simply and reliably.

According to an embodiment of the present invention, the buckle may be moved between the storage position and the use position by a motor.

Therefore, the structure of the buckle device is simple and the buckle device can be manufactured at low cost.

According to an embodiment of the present invention, the buckle-supporting member may be provided with the external-force-reducing mechanism. Therefore, even when an external force larger than the predetermined force is applied to the buckle, the external force can be reduced before being transmitted to the buckle-supporting member.

In addition, according to an embodiment of the present invention, since the motor may be driven when the withdrawal of the seat belt or the state in which the occupant is sitting on the vehicle seat is detected, the buckle can be automatically moved from the storage position to the use position when the buckle is used. Accordingly, although the buckle is placed at the storage position when the buckle is not used, the occupant can easily fasten the seat belt.

In addition, according to an embodiment of the present invention, since the motor may be driven when the separation of the tongue from the buckle is detected, the buckle can be automatically moved from the use position to the storage position when the buckle is not used.

According to the present invention, because the buckle device according to the present invention is used, the occupant can smoothly sit on or get off the vehicle seat and easily fasten the seat belt. Therefore, the occupant can get into and out of the vehicle without being obstructed by the buckle and the seat belt use rate increases.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 2(a) shows the state in which a buckle is at a storage position and FIG. 2(b) shows the state in which the buckle is at a use position.

FIG. 4(a) shows the state in which the buckle is at the storage position, FIG. 4(b) shows a sectional view of FIG. 4(a) taken along line IVB-IVB, FIG. 4(c) shows the state in which the buckle is at the use position, and FIG. 4(d) shows the state in which the external-force reducing mechanism is activated.

FIG. 6(a) shows the state in which the buckle is at the storage position, FIG. 6(b) shows a sectional view of FIG. 6(a) taken along line IVB-IVB, FIG. 6(c) shows the state in which the buckle is at the use position, and FIG. 6(d) shows the state in which the external-force reducing mechanism is activated.

DETAILED DESCRIPTION

Figure 1:
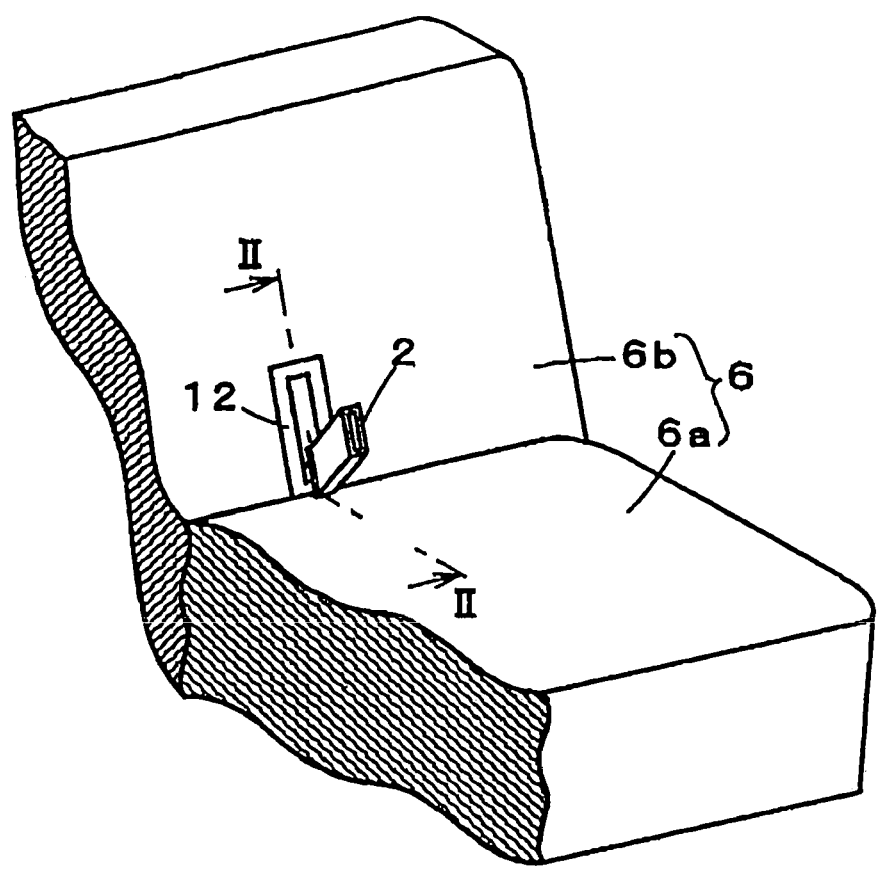
FIG. 1 is a partially cutout perspective view schematically showing a vehicle rear seat incorporating a buckle device according to a first embodiment of the present invention.
Figure 2:
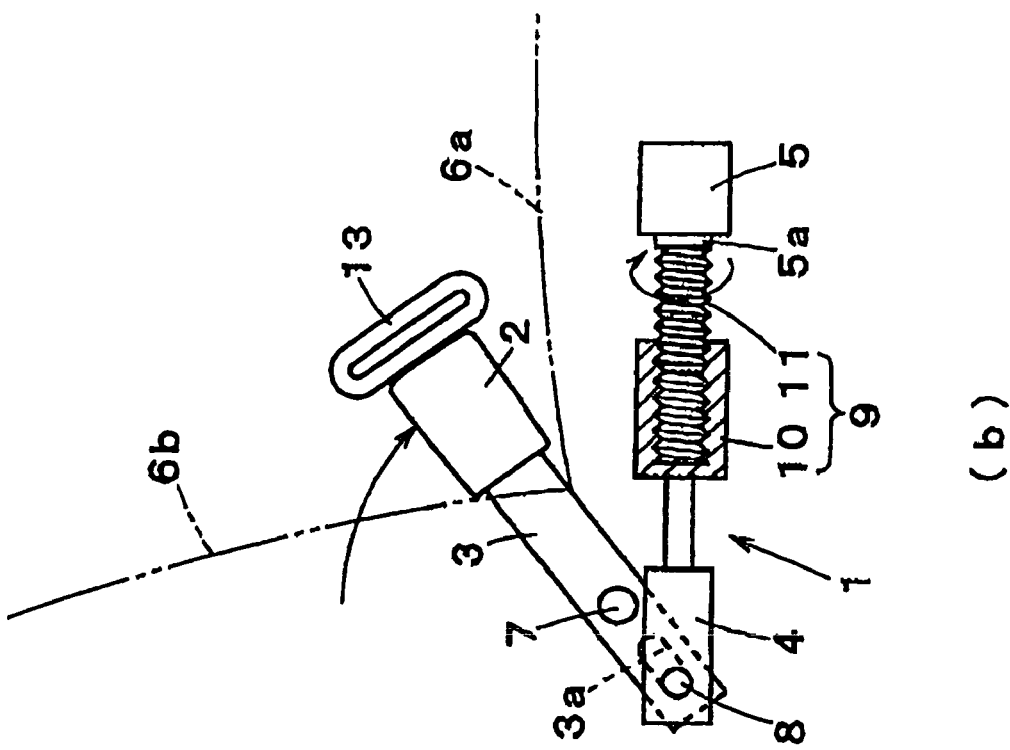
FIG. 2 shows sectional views of the buckle device according to the first embodiment shown in FIG. 1 taken along line II-II, where
Figure 2:
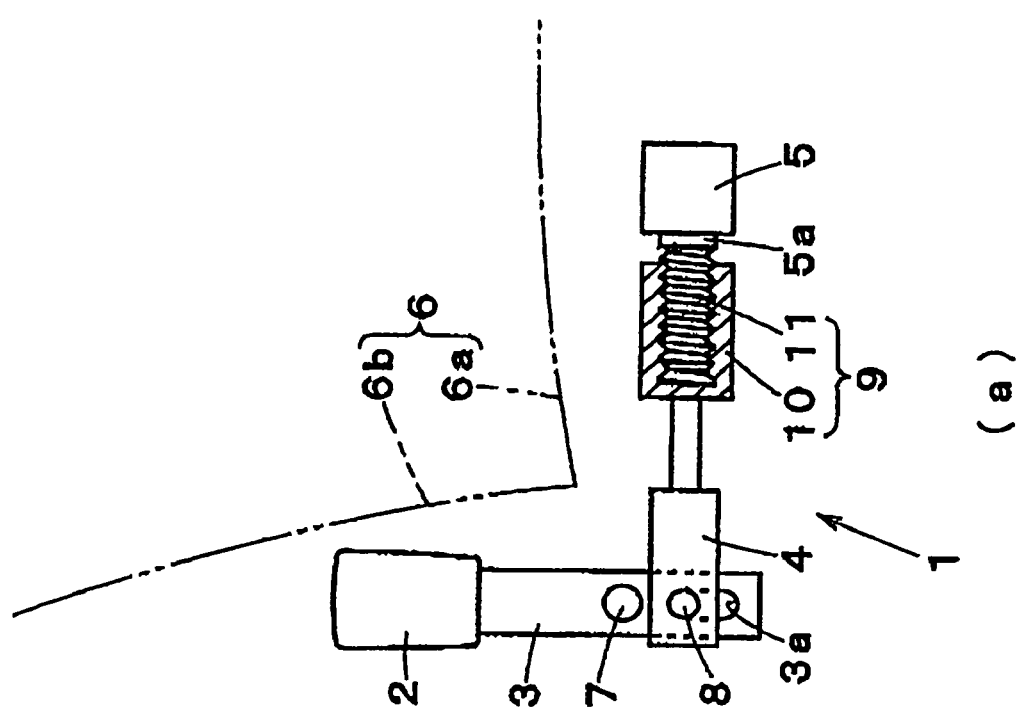

FIG. 1 is a partially cutout perspective view schematically showing a vehicle rear seat incorporating a buckle device according to an embodiment of the present invention. FIG. 2 show sectional views of the buckle device according to the first embodiment shown in FIG. 1 taken along line II-II, where (a) shows the state in which a buckle is at a storage position and (b) shows the state in which the buckle is at a use position.

As shown in FIGS. 1, 2(a), and 2(b), a buckle device 1 according to the first embodiment includes a known buckle 2, a supporting lever 3 connected to the buckle 2, a lever-rotating member 4 which rotates the supporting lever 3, and a motor (for moving buckle) 5 which drives the lever-rotating member 4.

The supporting lever 3 is attached to a vehicle rear seat 6 or a vehicle body such that the supporting lever 3 can rotate about a rotating shaft 7 in the front-rear direction of the vehicle. The supporting lever 3 has a long hole 3a which extends in the longitudinal direction of the supporting lever 3 at a position opposite to the buckle 2 across the rotating shaft 7. A connecting pin 8 extends through the long hole 3a in a slidable manner, and the supporting lever 3 and the lever-rotating member 4 are connected to each other with the connecting pin 8 such that they can rotate and move relative to each other.

The lever-rotating member 4 is connected to a rotating shaft 5a of the motor 5 with an expansion/contraction thread mechanism 9 at an end opposite to the end at which the supporting lever 3 is connected. The expansion/contraction thread mechanism 9 includes an internal thread member 10 fixed to the lever-rotating member 4 and an external thread member 11 which is formed on the rotating shaft 5a and which meshes with the internal thread member 10. The internal thread member 10 may also be formed separately from the rotating shaft 5a and be connected to the rotating shaft 5a.

When the rotating shaft 5a of the motor 5 rotates and the external thread member 11 rotates together in the same direction, the internal thread member 10 reversibly moves rightward or leftward in FIGS. 2(a) and 2(b) depending on the rotating direction of the motor 5. Accordingly, the expansion/contraction thread mechanism 9 expands or contracts. The motor 5 and the expansion/contraction thread mechanism 9 are disposed in or under a seat cushion 6a of the vehicle rear seat 6.

In this embodiment, buckle-moving device according to the present invention is composed of the lever-rotating member 4, the motor 5, and the expansion/contraction thread mechanism 9.

As shown in FIG. 2(a), when the buckle 2 is not used, the expansion/contraction thread mechanism 9 contracts to a minimum length, so that the supporting lever 3 extends substantially vertically and the buckle 2 is placed at the storage position in a seat back 6b of the vehicle rear seat 6. In addition, as shown in FIG. 2(b), when the buckle 2 is used, the expansion/contraction thread mechanism 9 expands to a maximum length and the lever-rotating member 4 rotates the supporting lever 3 clockwise about the rotating shaft 7. While the supporting lever 3 is rotated, the connecting pin 8 slides along the long hole 3a formed in the supporting lever 3. Thus, the buckle 2 passes through a buckle hole 12 formed in the seat back 6b and moves to the use position at which the buckle 2 projects out from the vehicle rear seat 6. When the motor 5 stops, the buckle 2 is locked at the use position due to the engagement between the internal thread member 10 and the external thread member 11. A state in which a seat belt is worn by the occupant is maintained while the buckle 2 is at this use position.

Figure 3:
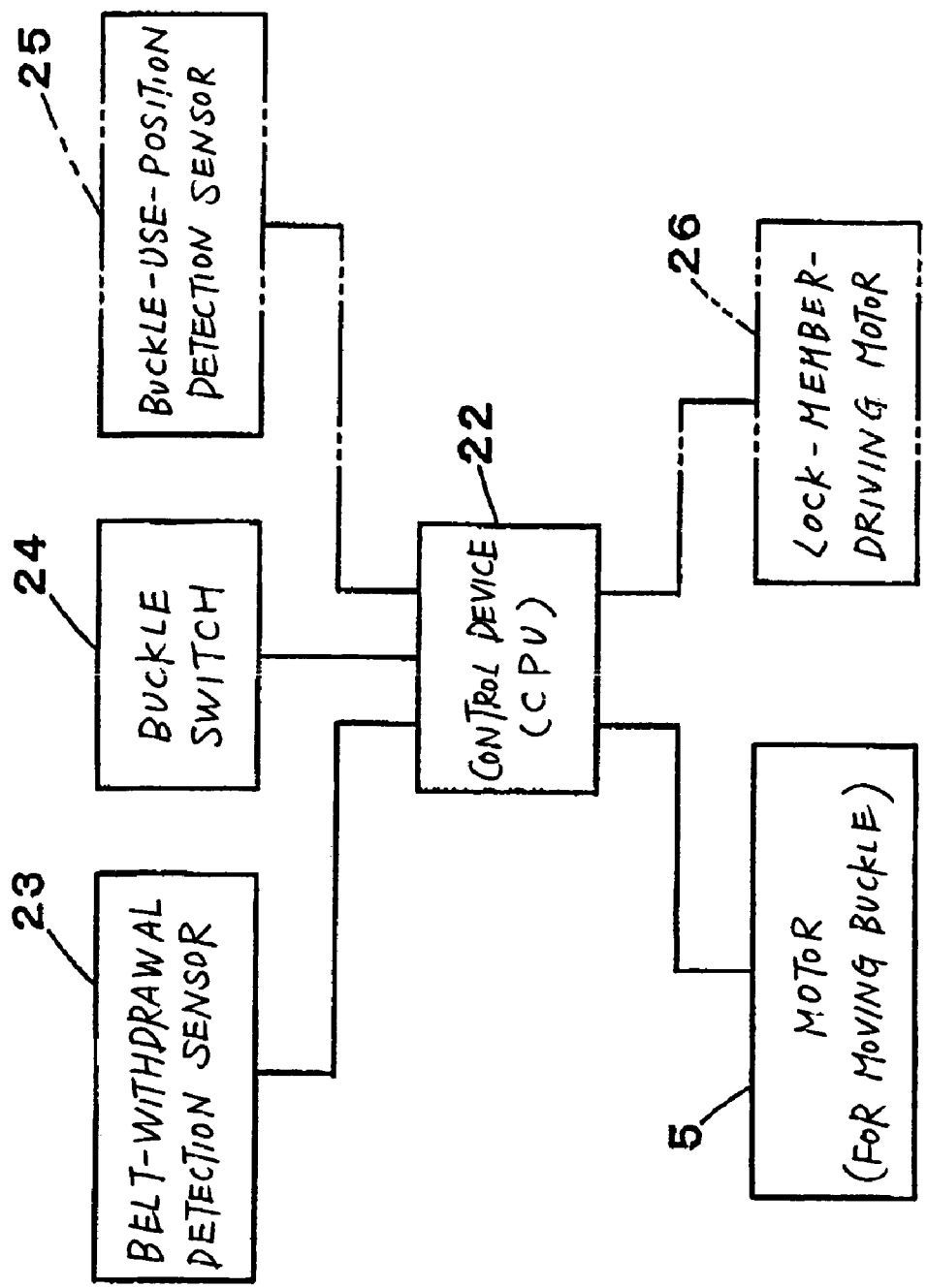
FIG. 3 is a block diagram showing a drive control system of a motor.

FIG. 3 is a block diagram showing a drive control system of the motor 5. As shown in FIG. 3, in a buckle device 1 according to an embodiment of the present invention, a control device (CPU) 22 for controlling the motor 5 is connected to a belt-withdrawal detection sensor 23 which detects a withdrawal of the seat belt and outputs a belt-withdrawal detection signal and a buckle switch 24 which turns on when a tongue 13 is inserted into the buckle and turns off when the tongue 13 is separated from the buckle. In the first embodiment, a separation detection signal representing the state in which the tongue 13 and the buckle 2 are separated from each other is output when the buckle switch 24 is turned off and no signal is output therefrom. The belt-withdrawal detection sensor 23 functions as belt-fastenable-state detecting device which detects the state in which the occupant can fasten the seat belt. In addition, the buckle switch 24 functions as removable-state detecting device which detects the state in which the seat belt is unfastened and the occupant can get off the vehicle rear seat 6.

Next, the operation of the buckle device 1 according to the first embodiment which is structured as described above will be described.

When the seat belt is not used, the expansion/contraction thread mechanism 9 contracts to a minimum length and the buckle 2 is at the storage position shown in FIG. 2(a). Accordingly, the buckle 2 does not project out from the vehicle rear seat 6, and is hidden in the seat back 6b. Thus, the appearance of the vehicle is improved.

In this state, the occupant gets in the vehicle and sits on the vehicle rear seat 6. Since the buckle 2 does not project out from the vehicle rear seat 6, the occupant can smoothly get into the vehicle and sit on the vehicle rear seat 6 without being obstructed by the buckle 2.

When the occupant withdraws the seat belt (not shown) after sitting on the vehicle rear seat 6, the belt-withdrawal detection sensor 23 (not shown) detects the withdrawal of the seat belt and outputs the belt-withdrawal detection signal to the control device 22. When the control device 22 receives the belt-withdrawal detection signal from the belt-withdrawal detection sensor 23, the control device 22 drives the motor 5 in a direction such that the expansion/contraction thread mechanism 9 expands.

Accordingly, the lever-rotating member 4 rotates the supporting lever 3 clockwise and the buckle 2 is moved to the use position shown in FIG. 2(b). Then, similar to known seat belt apparatuses, the occupant fastens the seat belt by inserting the tongue 13, which is slidably supported by the seat belt, into the buckle 2.

While the seat belt is fastened, a force applied to the buckle 2 via the seat belt by an inertial movement of the occupant is reliably received by the rotating shaft 7 via the supporting lever 3.

When the occupant detaches the tongue 13 from the buckle 2 to get out of the vehicle, the buckle switch 24 detects the separation of the tongue 13 from the buckle 2 and outputs the separation detection signal to the control device 22. When the control device 22 receives the separation detection signal from the buckle switch 24, the control device 22 drives the motor 5 in a direction such that the expansion/contraction thread mechanism 9 contracts.

Accordingly, the lever-rotating member 4 rotates the supporting lever 3 counterclockwise and the buckle 2 is moved to the storage position shown in FIG. 2(a). Therefore, the occupant can smoothly get off the vehicle rear seat 6 and out of the vehicle without being obstructed by the buckle 2.

In the buckle device 1 according to an embodiment of the present invention, the buckle 2 is stored at the storage position in the vehicle rear seat 6 while the buckle 2 is not used. Therefore, the buckle 2 does not obstruct the occupant when the occupant sits on or gets off the vehicle seat, and the occupant can smoothly sit on or get off the vehicle seat. Accordingly, the occupant can easily get into or out of the vehicle.

In addition, since the buckle 2 is automatically moved to the use position when the buckle 2 is used, it is not necessary for the occupant to take out the buckle 2 from a small buckle-storing section, unlike the apparatus disclosed in Japanese Examined Utility Model Registration Application Publication No. 3-20216. Accordingly, the occupant can easily fasten the seat belt.

In addition, since the buckle 2 is hidden in the vehicle rear seat 6 while the buckle 2 is not used, the appearance is improved, and dust and foreign bodies are prevented from entering the buckle 2. In addition, since the buckle 2 is at the use position when the buckle 2 is used, the seat belt reliably serves the function of restraining the occupant.

In addition, since all of the supporting lever 3, the lever-rotating member 4, the motor 5, and the expansion/contraction thread mechanism 9 have simple structures, the structure of the buckle device 1 is simple and the buckle device 1 can be manufactured at low cost.

The buckle device 1 according to the present invention may be incorporated in a known seat belt apparatus. When a seat belt apparatus includes the buckle device of the present invention, the occupant can smoothly sit on or get off the vehicle seat and easily fasten the seat belt, as described above. Therefore, the occupant can get into and out of the vehicle without being obstructed by the buckle and the seat belt use rate increases.

In the above-described example, the supporting lever 3 is constructed as a single integral piece. In comparison, as shown in FIGS. 4(a) and 4(b), the supporting lever 3 may also be provided with an external-force-reducing mechanism. The external-force-reducing mechanism will be described in more detail below. The supporting lever 3 is composed of two pieces: a buckle-side lever 3c connected to the buckle 2 and a lever-rotating-member-side lever 3r connected to the lever-rotating member 4. The lever-rotating-member-side lever 3r has the above-described long hole 3a through which the connecting pin 8 extends in a slidable manner, and the lever-rotating-member-side lever 3r and the lever-rotating member 4 are connected to each other with the connecting pin 8 such that they can rotate relative to each other.

The lever-rotating-member-side lever 3r is rotatably supported on the vehicle body by the rotating shaft 7, and the buckle-side lever 3c and the lever-rotating-member-side lever 3r are connected to each other by the rotating shaft 7 such that they can rotate relative to each other. Four fitting holes 3e, 3f, 3g, and 3h are formed in the buckle-side lever 3c with constant intervals. The four fitting holes 3e, 3f, 3g, and 3h are arranged point symmetrically with respect to the rotating shaft 7. In addition, four fitting holes 3i and 3j (the other two are not shown) are formed in the lever-rotating-member-side lever 3r. When the buckle-side lever 3c and the lever-rotating-member-side lever 3r are positioned along a straight line, as shown in FIG. 4(a), the fitting hole 3i in the lever-rotating-member-side lever 3r faces the fitting hole 3e in the buckle-side lever 3c, and another fitting hole in the lever-rotating-member-side lever 3r faces the fitting hole 3f in the buckle-side lever 3c, the fitting hole 3j in the lever-rotating-member-side lever 3r faces the fitting hole 3g in the buckle-side lever 3c, and the remaining fitting hole in the lever-rotating-member-side lever 3r faces the fitting hole 3h in the buckle-side lever 3c.

The fitting holes 3i and 3j in the lever-rotating-member-side lever 3r accommodate compression springs 3k and 3m and balls 3n and 3o, respectively (the other two fitting holes also accommodate respective compression springs and balls). The balls 3n and 3o are continuously urged against the buckle-side lever 3c by the compression springs 3k and 3m, respectively. Accordingly, as shown in FIG. 4(b), the four balls 3n and 3o are partially inserted and fitted in the respective fitting holes 3e, 3f, 3g, and 3h in the buckle-side lever 3c.

Accordingly, when the buckle 2 normally moves from the storage position shown in FIG. 4(a), which corresponds to FIG. 2(a), to the use position shown in FIG. 4(c), which corresponds to FIG. 2(b), the balls 3n and 3o urged by the compression springs 3k and 3m are fitted in the respective fitting holes 3e, 3f, 3g, and 3h in the buckle-side lever 3c. Accordingly, the buckle-side lever 3c and the lever-rotating-member-side lever 3r rotate together about the rotating shaft 7. In addition, when, for example, a clockwise moment is applied to the buckle 2 and an external force larger than a predetermined force is applied while the buckle 2 is at the use position shown in FIG. 4(c), the balls 3n and 3o move out from their respective fitting holes 3e, 3f, 3g, and 3h, as shown in FIG. 4(d), and the buckle-side lever 3c moves relative to the lever-rotating-member-side lever 3r. Accordingly, the buckle-side lever 3c and the lever-rotating-member-side lever 3r are bent relative to each other. Since the buckle-side lever 3c and the lever-rotating-member-side lever 3r are bent relative to each other, the external force applied to the buckle 2 is reduced before being transmitted to the buckle-side lever 3c, the lever-rotating-member-side lever 3r, and the lever-rotating member 4.

Since it is not necessary to reduce the external force applied to the buckle 2 if the external force is smaller than the predetermined force, the buckle-side lever 3c and the lever-rotating-member-side lever 3r are of course not bent relative to each other. Thus, the external-force-reducing mechanism for reducing the external force applied to the buckle 2 if the applied external force is larger than the predetermined force is composed of the buckle-side lever 3c, the lever-rotating-member-side lever 3r, the fitting holes 3e, 3f, 3g, and 3h, the fitting holes 3i and 3j, the compression springs 3k and 3m, and the balls 3n and 3o.

FIGS. 5(a) and 5(b) are diagrams corresponding to FIGS. 2(a) and 2(b), respectively, schematically showing a second embodiment of the present invention. In the following description, components similar to those described above are denoted by the same reference numeral, and detailed explanations thereof are thus omitted.

Figure 5:
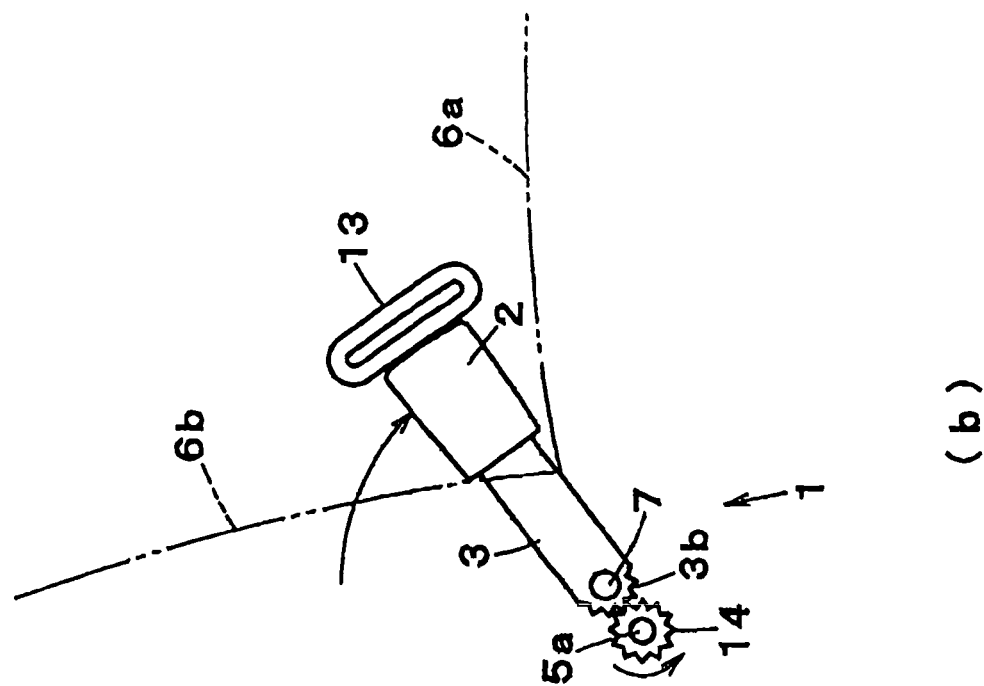
FIGS. 5(a) and 5(b) are diagrams corresponding to FIGS. 2(a) and 2(b), respectively, schematically showing a second embodiment of the present invention.
Figure 5:
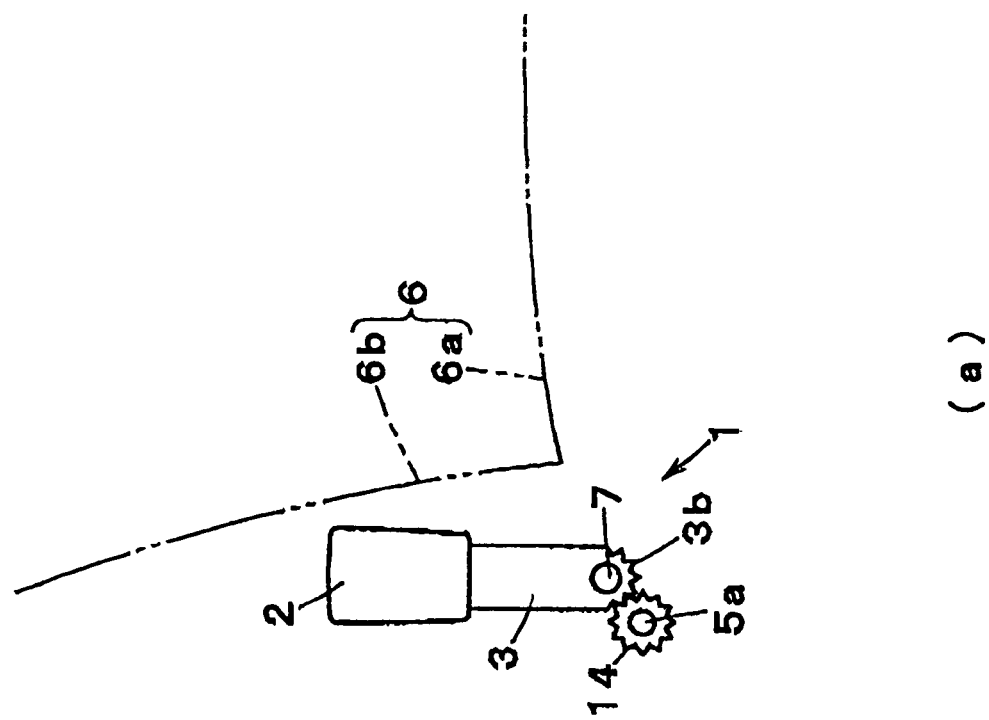

In the above-described embodiment, the buckle-moving device includes the lever-rotating member 4 and the expansion/contraction thread mechanism 9. In comparison, as shown in FIGS. 5(a) and 5(b), according to the second embodiment, a buckle device 1 includes neither the lever-rotating member 4 nor the expansion/contraction thread mechanism 9. Instead, the buckle device 1 according to the second embodiment includes a pinion 14 fixed to a rotating shaft 5a of a motor 5 (not shown in FIG. 5). In addition, in place of the long hole 3a formed in the above-described supporting lever 3, a supporting lever 3 having a semicircular gear 3b at an end opposite to a buckle 2 is provided. The gear 3b meshes with the pinion 14, and the supporting lever 3 rotates when the pinion 14 is rotated together with the rotating shaft 5a of the motor 5.

Thus, the buckle-moving device according to the present invention is composed of the gear 3b, the motor 5, and the pinion 14.

Similar to the prior embodiment, also in the buckle device 1 according to another embodiment, a storage position shown in FIG. 5(a) at which the buckle 2 is hidden in a vehicle rear seat 6 and a use position shown in FIG. 5(b) at which the buckle 2 projects out from the vehicle rear seat 6 are set.

Other structures and operations of the buckle device 1 according to this embodiment are substantially similar to those described in the prior embodiment.

In the buckle device 1 according to an embodiment of the present invention, both the supporting lever 3 and the pinion 14 have simple structures. Accordingly, the structure of the buckle device 1 is simple and the buckle device 1 can be manufactured at low cost. Other effects obtained by the buckle device 1 according to this embodiment are substantially similar to those described in the prior embodiment, and effects obtained by a seat belt apparatus using the buckle device 1 are also similar.

Figure 4:
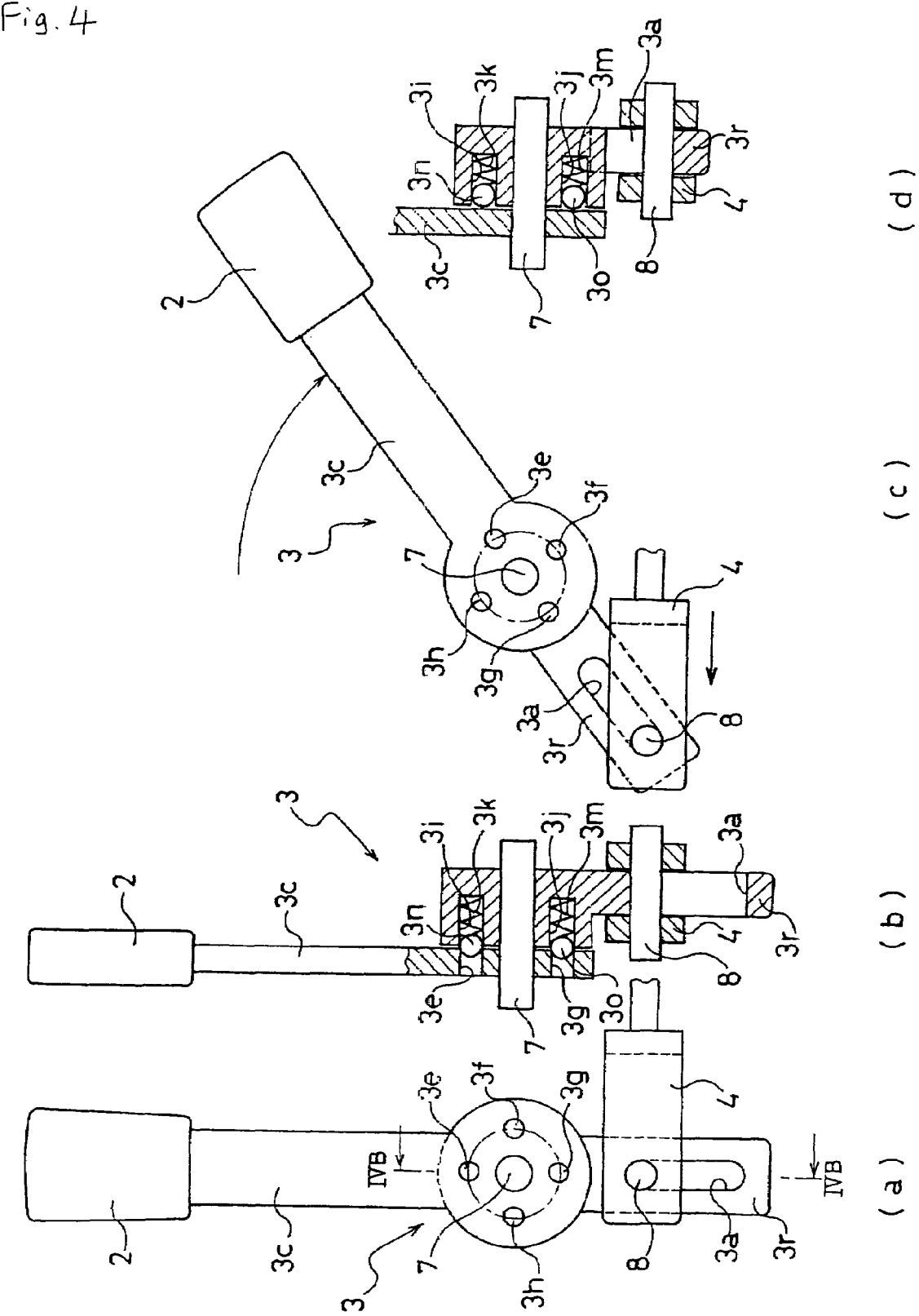
FIG. 4 schematically shows an external-force reducing mechanism provided on a supporting lever shown in FIG. 2, where
Figure 6:
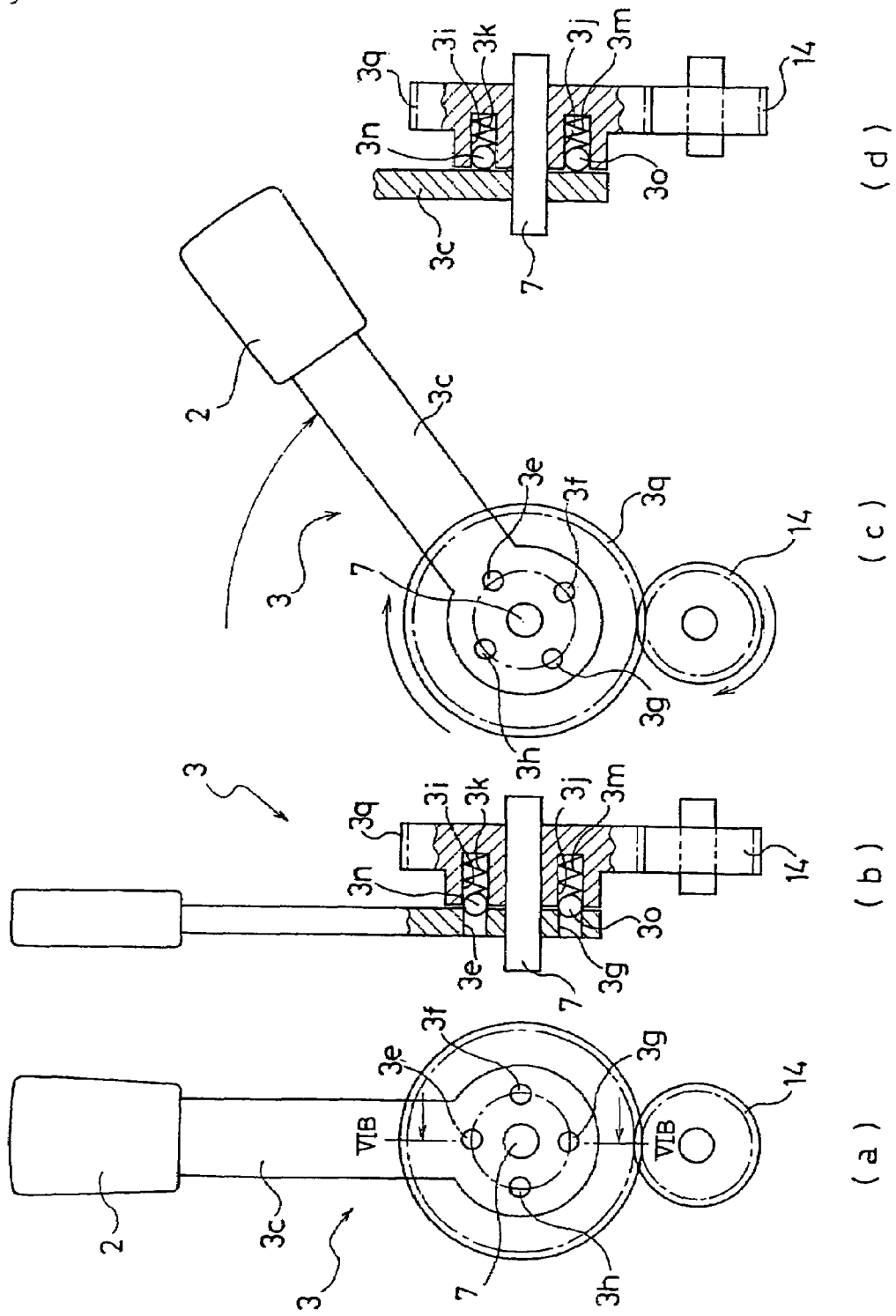
FIG. 6 schematically shows an external-force reducing mechanism provided on a supporting lever shown in FIG. 5, where

Also in the embodiment shown in FIG. 5, as shown in FIGS. 6(*a*) to 6(*d*), the supporting lever 3 may be provided with an external-force-reducing mechanism similar to that shown in FIGS. 4(*a*) to 4(*d*). Also in this external-force-reducing mechanism, the supporting lever 3 is composed of two pieces: a buckle-side lever 3*c* and a gear 3*q* which meshes with the pinion 14. The buckle-side lever 3*c* and the gear 3*q* are connected to each other with balls 3*n* and 3*o* urged by compression springs 3*k* and 3*m*. Accordingly, when an external force larger than a predetermined force is applied to the buckle 2, the external force is reduced before being transmitted to the buckle-side lever 3*c*, the gear 3*q*, and the pinion 14. The operation of the external-force-reducing mechanism according to this embodiment is substantially similar to that of the external-force-reducing mechanism shown in FIGS. 4(*a*) to 4(*d*), and explanations thereof are thus omitted. In this case, the lever-rotating-member-side lever 3*r* included in the external-force-reducing mechanism shown in FIGS. 4(*a*) to 4(*d*) is simply replaced by the gear 3*q*.

Figure 7:
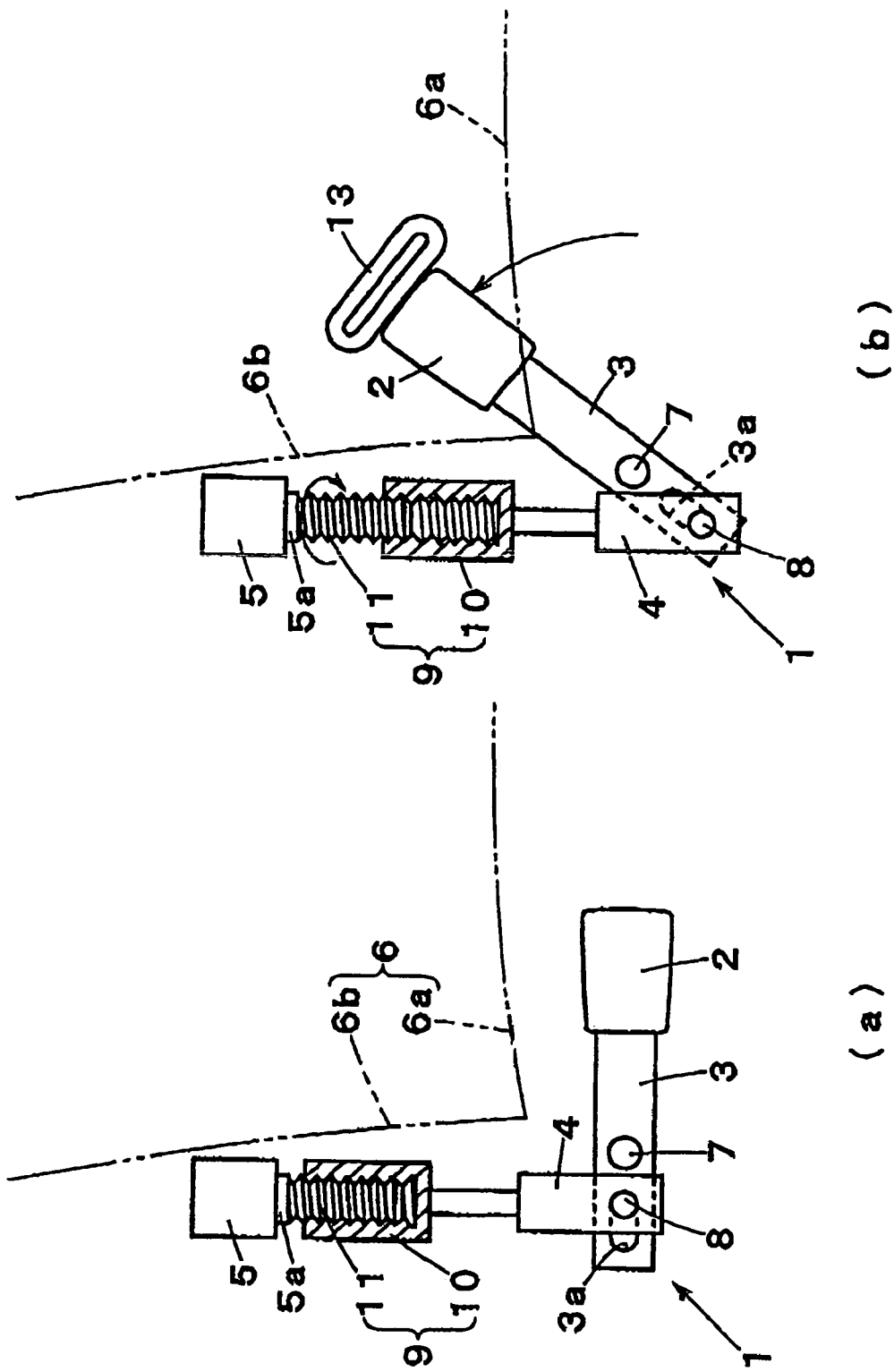
FIGS. 7(a) and 7(b) are diagrams corresponding to FIGS. 2(a) and 2(b), respectively, schematically showing a third embodiment of the present invention.

FIGS. 7(*a*) and 7(*b*) are diagrams corresponding to FIGS. 2(*a*) and 2(*b*), respectively, schematically showing a third embodiment of the present invention.

In the above-described first embodiment, the buckle 2 is placed behind the seat back 6*b* when the buckle 2 is at the storage position, and both the motor 5 and the expansion/contraction thread mechanism 9 are placed under the seat cushion 6*a*. In comparison, as shown in FIGS. 7(*a*) and 7(*b*), in a buckle device 1 according to another embodiment, a buckle 2 is placed under a seat cushion 6*a* when the buckle 2 is at the storage position, and a motor 5 and an expansion/contraction thread mechanism 9 are both placed behind a seat back 6*b*.

In addition, although not shown in the figures, a buckle hole 12 is formed in the seat cushion 6*a* in the third embodiment.

Accordingly, the buckle 2 is hidden under the seat cushion 6*a*, and projects out from the seat cushion 6*a* when it is moved to the use position.

Other structures, operations, and effects obtained by the buckle device 1 according to the third embodiment are substantially similar to those described in the first embodiment, and effects obtained by a seat belt apparatus using the buckle device 1 according to the third embodiment are also similar to those described in the first embodiment.

Figure 8:
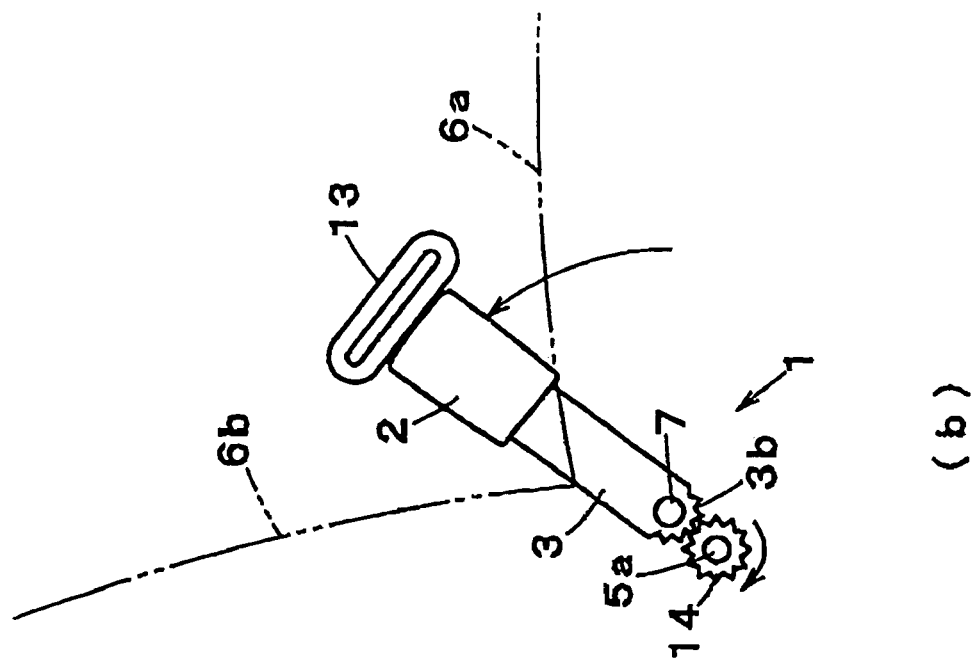
FIGS. 8(a) and 8(b) are diagrams corresponding to FIGS. 5(a) and 5(b), respectively, schematically showing a fourth embodiment of the present invention.
Figure 8:
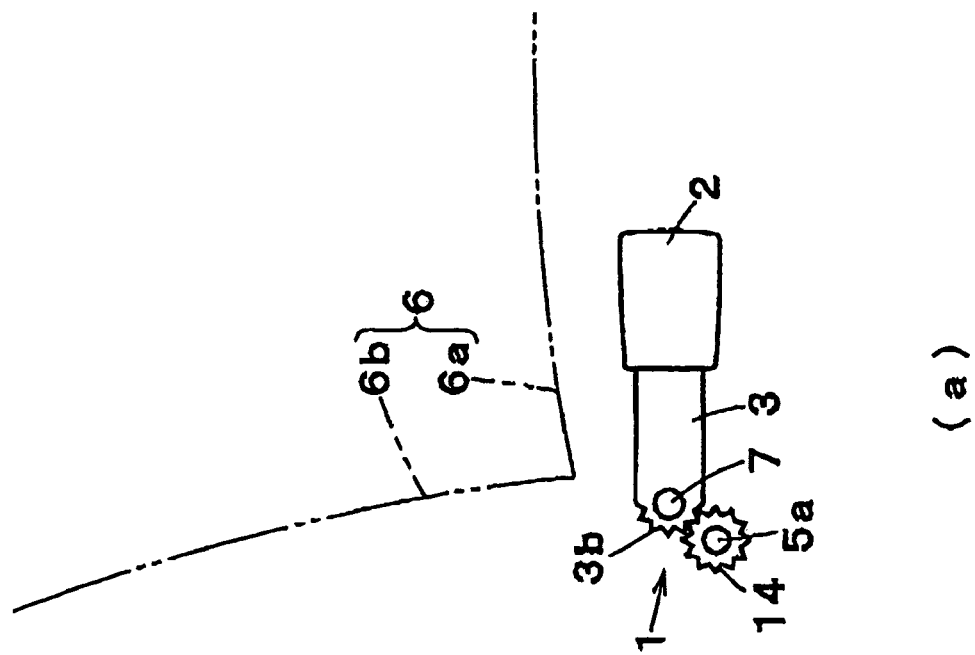

FIGS. 8(*a*) and 8(*b*) are diagrams corresponding to FIGS. 5(*a*) and 5(*b*), respectively, schematically showing another embodiment of the present invention.

In the above-described second embodiment, the buckle 2 is placed behind the seat back 6*b* when the buckle 2 is at the storage position. In comparison, as shown in FIGS. 8(*a*) and 8(*b*), in a buckle device 1 according to the fourth embodiment, a buckle 2 is placed under a seat cushion 6*a* when the buckle 2 is at the storage position.

In addition, although not shown in the figures, a buckle hole 12 is formed in the seat cushion 6*a* in the this embodiment.

Accordingly, the buckle 2 is hidden under the seat cushion 6*a*, and projects out from the seat cushion 6*a* when it is moved to the use position.

Other structures, operations, and effects obtained by the buckle device 1 according to the fourth embodiment are substantially similar to those described in the second embodiment, and effects obtained by a seat belt apparatus using the buckle device 1 according to the fourth embodiment are similar to those described in the first embodiment.

Figure 9:
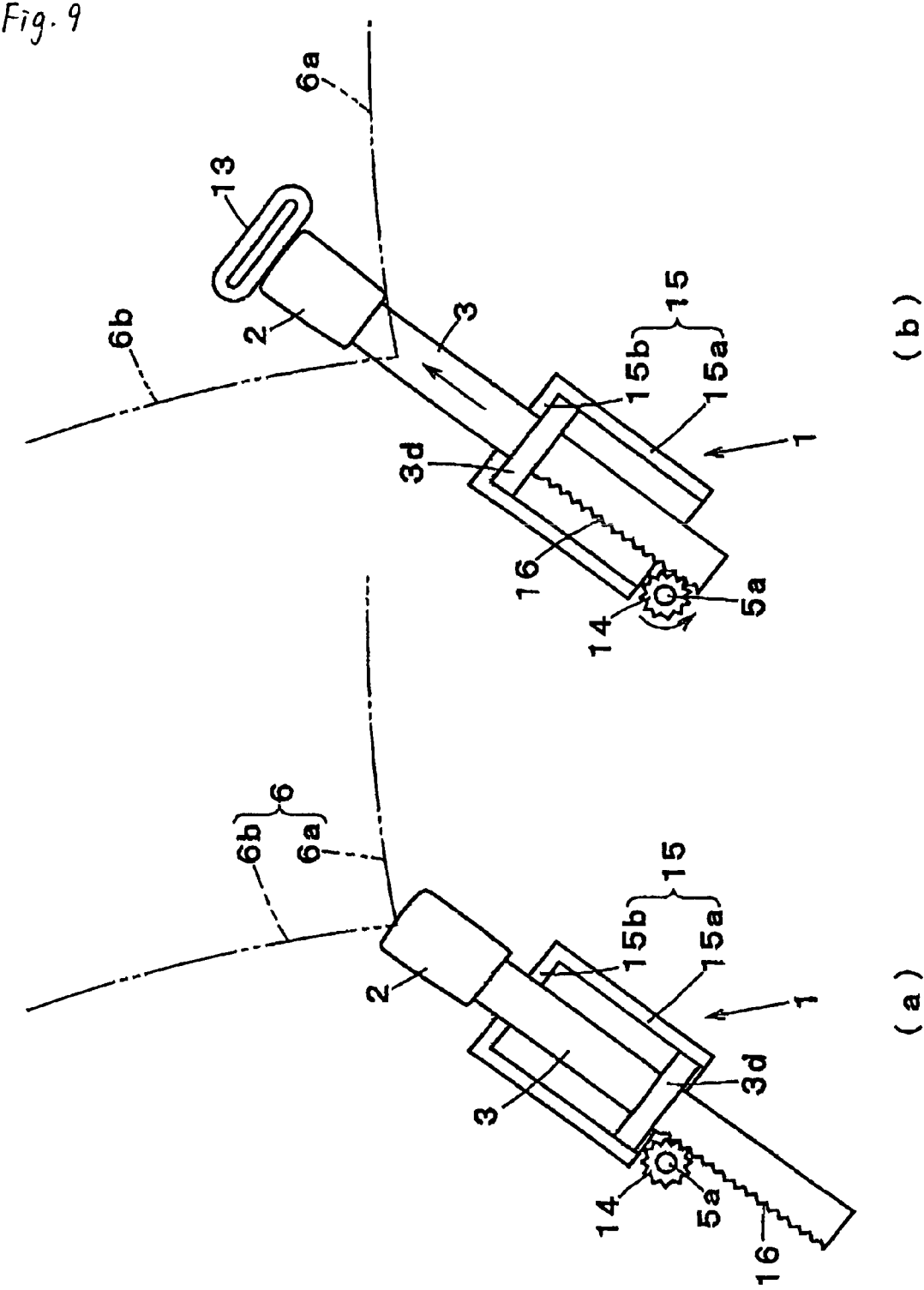
FIGS. 9(a) and 9(b) are diagrams corresponding to FIGS. 2(a) and 2(b), respectively, schematically showing a fifth embodiment of the present invention.

FIGS. 9(*a*) and 9(*b*) are diagrams corresponding to FIGS. 2(*a*) and 2(*b*), respectively, schematically showing another embodiment of the present invention.

In the above-described second embodiment, the supporting lever 3 is rotated using the pinion 14 and the gear 3*b* provided on the supporting lever 3 by rotating the rotating shaft 5*a* of the motor 5, and the buckle 2 is moved to the storage position or the use position accordingly. In comparison, as shown in FIGS. 9(*a*) and 9(*b*), in a buckle device 1 according to the fifth embodiment, a supporting lever 3 having a rack 16 is used in place of the supporting lever 3 having the gear 3*b*. The rack 16 meshes with the pinion 14, and the supporting lever 3 is moved linearly by the pinion 14 when the rotating shaft 5*a* of the motor 5 rotates. In the fifth embodiment, a buckle 2 and the supporting lever 3 are positioned in a boundary region between a seat cushion 6*a* and a seat back 6*b*. Accordingly, although not shown in the figures, a buckle hole 12 is formed in both the seat cushion 6*a* and the seat back 6*b*.

The buckle 2 and the supporting lever 3 may also be provided in a region under the seat cushion 6*a* or behind the seat back 6*b*.

In addition, the supporting lever 3 is provided with a flange-shaped stopper 3*d*, and a guiding/restraining member 15 which guides the flange-shaped stopper 3*d* and restrains the movement of the flange-shaped stopper 3*d* is fixed to a vehicle rear seat 6 or a vehicle body. The guiding/restraining member 15 includes a guiding portion 15*a* which guides the flange-shaped stopper 3*d* and a movement-restraining portion 15*b* which restrains the movement of the flange-shaped stopper 3*d* in the direction in which the buckle 2 further extends from a use position thereof.

In this embodiment, buckle-moving device according to the present invention is composed of the motor 5, the pinion 14, and the rack 16.

Similar to the above-described embodiments, also in the buckle device 1 according to the fifth embodiment, a storage position shown in FIG. 9(*a*) at which the buckle 2 is hidden in the vehicle rear seat 6 and a use position shown in FIG. 9(*b*) at which the buckle 2 projects out from the vehicle rear seat 6 are set.

In the buckle device 1 according to the fifth embodiment, different from the above-described embodiments, the supporting lever 3 moves linearly but does not rotate. Accordingly, the supporting lever 3 can move more stably, and the buckle 2 can be moved more reliably to the storage position or the use position. When the buckle 2 is at the usage portion, the flange-shaped stopper 3*d* of the supporting lever 3 is in contact with the movement-restraining portion 15*b* and is restrained from moving in the direction in which the buckle 2 further extends from the use position.

In addition, when a force is applied to the buckle 2 as described above, the force is reliably received by the guiding/restraining member 15 via the supporting lever 3 and the flange-shaped stopper 3*d*.

Other structures, operations, and effects obtained by the buckle device 1 according to the fifth embodiment are substantially similar to those described in the second embodiment, and effects obtained by a seat belt apparatus using the buckle device 1 according to the fifth embodiment are similar to those described in the first embodiment.

Figure 10:
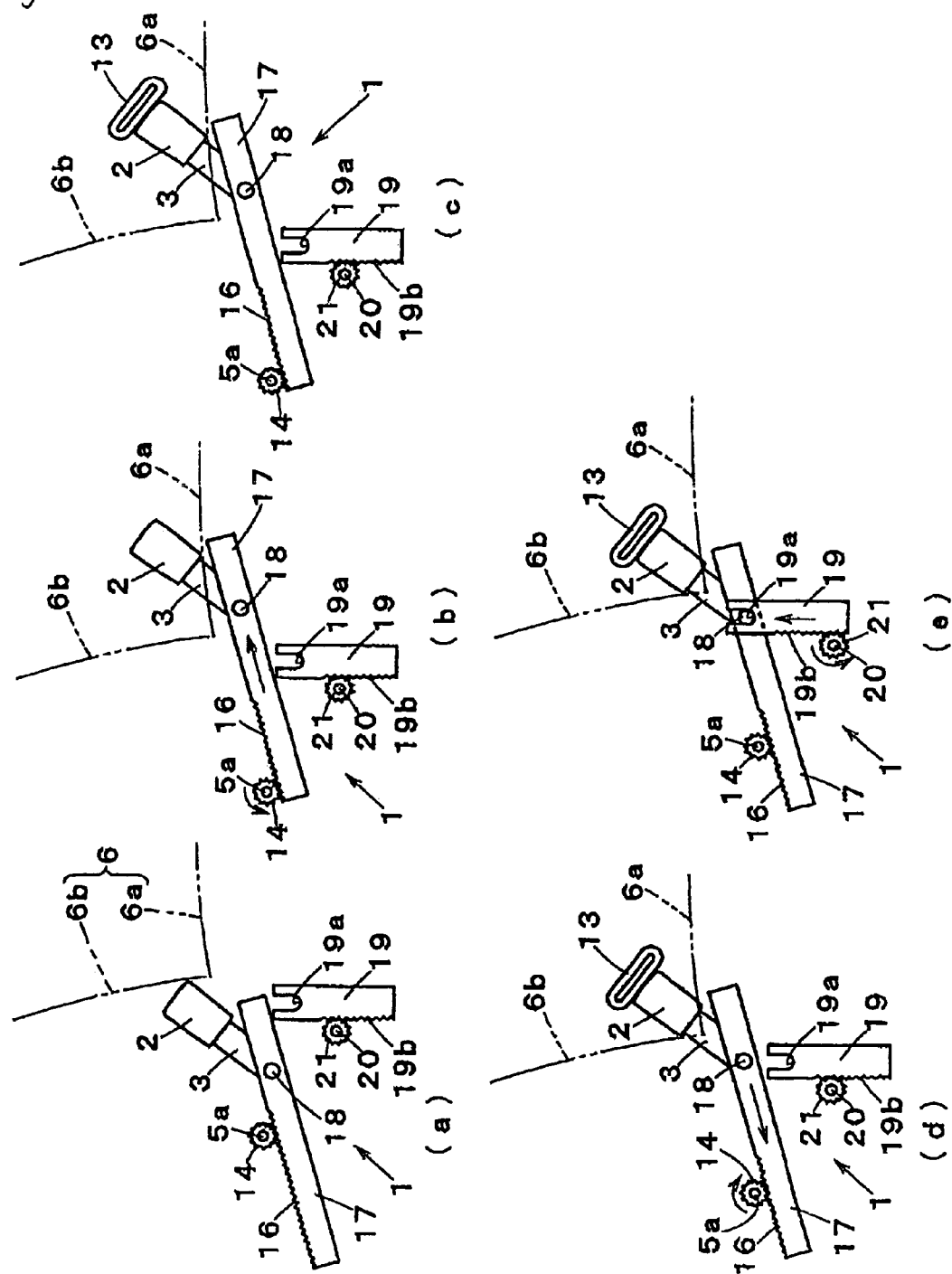
FIGS. 10(a) to 10(e) are diagrams schematically showing a sixth embodiment of the present invention, where FIGS. 10(a) and 10(e) correspond to FIGS. 9(a) and 9(b), respectively.

FIGS. 10(a) to 10(e) are diagrams schematically showing a sixth embodiment of the present invention, where FIGS. 10(a) and 10(e) correspond to FIGS. 9(a) and 9(b), respectively.

In the above-described fifth embodiment, the rack 16 is provided on the supporting lever 3. In comparison, as shown in FIGS. 10(a) to (e), in a buckle device 1 according to the sixth embodiment, a rack 16 is not provided on a supporting lever 3, but is provided on a rack member 17. The supporting lever 3 is integrally fixed to the rack member 17 with a fixing pin 18, and the rack member 17 linearly moves in the longitudinal direction thereof. A pinion 14 meshes with the rack 16 provided on the rack member 17.

In the sixth embodiment, in place of the guiding/restraining member 15 according to the fifth embodiment, a lock member 19 is provided on a vehicle rear seat 6 or a vehicle body such that the lock member 19 can move vertically (in the vertical direction in the figures). A notch 19a which can receive the fixing pin 18 is formed at the upper end of the lock member 19, and a rack 19b is formed on a side of the lock member 19. In addition, a lock-member-driving motor 26 (shown by two-dot chain lines in FIG. 3) which drives the lock member 19 is fixed to the vehicle rear seat 6 or the vehicle body, and a rotating shaft 20 of the lock-member-driving motor 26 is fixed to a lock-member-driving pinion 21. The lock-member-driving pinion 21 meshes with the rack 19b, and the rack 19b moves vertically when the lock-member-driving pinion 21 rotates. The lock-member-driving motor 26 may also be omitted if the buckle-moving motor 5 is used in common. In such a case, a clutch for selectively transmitting the rotation of the motor 5 to the pinions 14 and 21 must be provided. This clutch is preferably an electromagnetic clutch or the like which can be controlled by the control device 22 of the motor 5.

In the sixth embodiment, in order to control the lock-member-driving motor 26 with the control device 22, a buckle-use-position detection sensor 25 which detects the state in which the buckle 2 is at a use position and the lock-member-driving motor 26 are connected to the control device 22, as shown by two-dot chain lines in FIG. 3. The buckle-use-position detection sensor 25 may be any type of detecting device as long as the state in which the buckle 2 is at the use position can be detected.

In the sixth embodiment, a storage position shown in FIG. 10(a), an attachment position shown in FIGS. 10(b) and 10(c), and the use position shown in FIGS. 10(d) and 10(e) are set.

In the buckle device 1 according to the sixth embodiment, when an occupant sits on the vehicle rear seat 6 and withdraws a seat belt while the buckle 2 is at the storage position shown in FIG. 10(a), the control device 22 controls the motor 5, similar to the above-described embodiments. Then, as shown in FIG. 10(b), the pinion 14 rotates to move the rack member 17 linearly, and accordingly the buckle 2 passes through a buckle hole 12 formed in a seat cushion 6a and a seat back 6b and moves to the attachment position. While the buckle 2 is at the attachment position, the occupant inserts a tongue 13 into the buckle 2, as shown in FIG. 10(c), similar to the above-described embodiments. Since the buckle 2 is at the attachment position, the occupant can easily insert the tongue 13 into the buckle 2.

A buckle switch 24 is activated when the tongue 13 engages with the buckle 2, and then the control device 22 rotates the motor 5 in the reverse direction. Accordingly, the pinion 14 rotates in the reverse direction to move the rack member 17 in the reverse direction, as shown in FIG. 10(d), and the control device 22 stops the motor 5 when the buckle 2 reaches the use position.

Next, the buckle-use-position detection sensor 25 detects that the buckle 2 is at the use position, and the detection signal is transmitted to the control device 22. Then, as shown in FIG. 10(e), the control device 22 drives the lock-member-driving motor 26 such that the lock member 19 is moved upward by the lock-member-driving pinion 21. Accordingly, the fixing pin 18 enters the notch 19a in the lock member 19 and comes into contact with the bottom portion of the notch 19a, and then the control device 22 stops the lock-member-driving motor 26. Thus, the position of the rack member 17 is locked by the lock member 19 and the buckle 2 is anchored at the use position. Accordingly, when a force is applied to the buckle 2 as described above, the force is reliably received by the lock member 19.

When the occupant detaches the tongue 13 from the buckle 2, the control device 22 receives a separation detection signal from the buckle switch 24 as described above, and drives the lock-member-driving motor 26 in the reverse direction. Accordingly, the lock member 19 moves downward, so that the fixing pin 18 moves out from the notch 19a and the position of the rack member 17 is unlocked, as shown in FIG. 10(d). Then, the control device 22 drives the motor 5 in the reverse direction to move the rack member 17 in the reverse direction. Then, when the buckle 2 reaches the storage position shown in FIG. 10(a), the control device 22 stops the motor 5.

Other structures, operations, and effects obtained by the buckle device 1 according to the sixth embodiment are substantially similar to those described in the fifth embodiment, and effects obtained by a seat belt apparatus using the buckle device 1 according to the sixth embodiment are similar to those described in the first embodiment.

Figure 11:
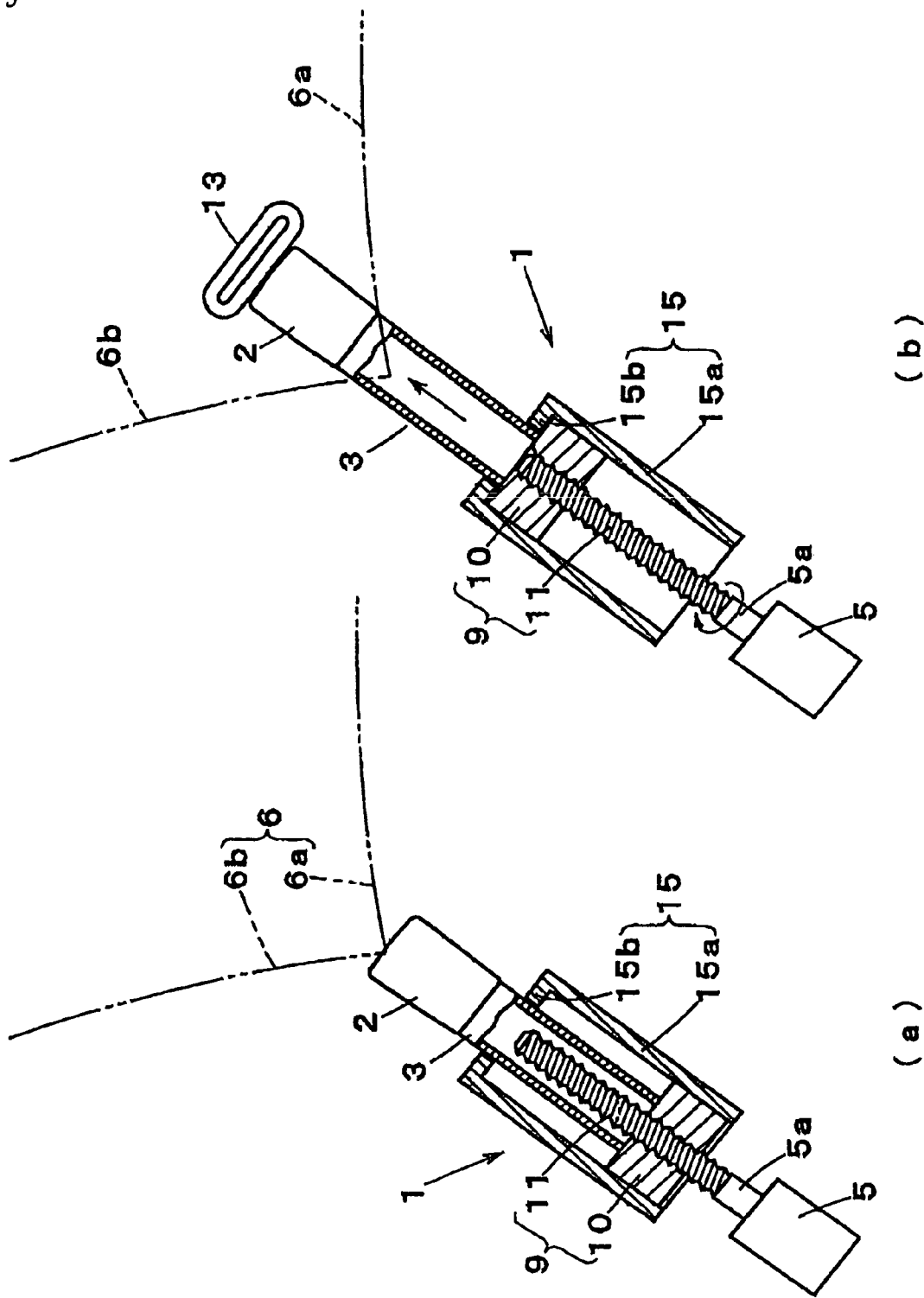
FIGS. 11(a) and 11(b) are diagrams corresponding to FIGS. 9(a) and 9(b), respectively, schematically showing a seventh embodiment of the present invention.

FIGS. 11(a) and 1(b) are diagrams corresponding to FIGS. 9(a) and 9(b), respectively, schematically showing a seventh embodiment of the present invention.

In the above-described fifth embodiment shown in FIGS. 9(a) and 9(b), the buckle 2 is linearly moved to the storage position or the use position using the pinion 14 and the rack 16 provided on the supporting lever 3 by rotating the pinion 14 together with the rotating shaft 5a of the motor 5. In comparison, as shown in FIGS. 11(a) and 11(b), in a buckle device 1 according to the seventh embodiment, an expansion/contraction thread mechanism 9 similar to that shown in FIGS. 2(a) and (b) according to the first embodiment is provided in place of the pinion 14 and the rack 16.

The expansion/contraction thread mechanism 9 includes an internal thread member 10 and an external thread member 11 which is formed on a rotating shaft 5a of a motor 5 and which meshes with the internal thread member 10. The internal thread member 10 is connected to a cylindrical supporting lever 3 which supports a buckle 2. In addition, the internal thread member 10 is fixed to a cylindrical guiding/restraining member 15 which is fixed to a vehicle rear seat 6 or a vehicle body. The guiding/restraining member 15 includes a guiding portion 15a which guides the internal thread member 10 along the longitudinal direction of the guiding/restraining member 15 while restraining the rotation thereof, and a movement-restraining portion 15b which restrains the movement of the internal thread member 10 in the direction in which the buckle 2 further extends from a use position thereof.

When the rotating shaft 5a of the motor 5 rotates and the external thread member 11 rotates together in the same direction, the internal thread member 10 reversibly moves along the rotating shaft 5a depending on the rotating direction of the motor 5. Thus, the expansion/contraction thread mechanism 9 expands or contracts. In other words, the supporting lever 3 extends from or retracts into the guiding/restraining member 15.

In this embodiment, buckle-moving device according to the present invention is composed of the motor 5, the expansion/contraction thread mechanism 9 and the guiding/restraining member 15.

Similar to the above-described embodiments excluding the sixth embodiment, also in the buckle device 1 according to the seventh embodiment, a storage position shown in FIG. 11(a) at which the buckle 2 is hidden in the vehicle rear seat 6 and a use position (lock position) shown in FIG. 11(b) at which the buckle 2 projects out from the vehicle rear seat 6 are set.

In the buckle device 1 according to the seventh embodiment, similar to the above-described fifth embodiment, the supporting lever 3 moves linearly but does not rotate. Accordingly, the supporting lever 3 can move more stably, and the buckle 2 can be moved more reliably to the storage position or the use position. When the buckle 2 is at the usage portion, the internal thread member 10 fixed to the supporting lever 3 is in contact with the movement-restraining portion 15b and is locked and retained from moving in the direction in which the buckle 2 further extends from the use position.

In addition, when a force is applied to the buckle 2 as described above, the force is reliably received by the guiding/restraining member 15 via the supporting lever 3 and the internal thread member 10.

Other structures, operations, and effects obtained by the buckle device 1 according to the seventh embodiment are substantially similar to those described in the fifth embodiment, and effects obtained by a seat belt apparatus using the buckle device 1 according to the seventh embodiment are similar to those described in the first embodiment.

Figure 12:
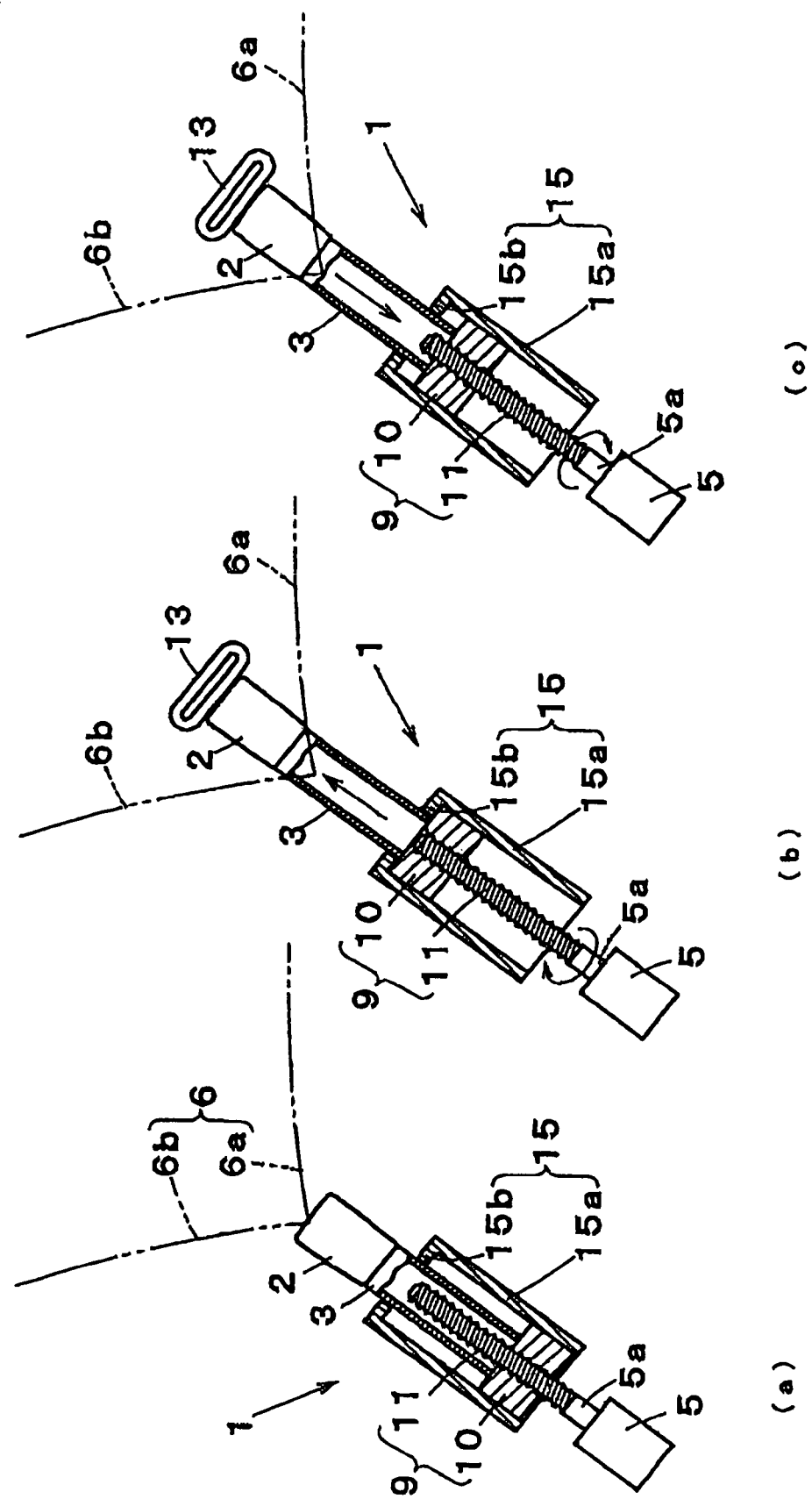
FIGS. 12(a) to 12(c) are diagrams corresponding to FIGS. 10(a), 10(c), and 10(e), respectively, schematically showing an eighth embodiment of the present invention.

FIGS. 12(a) to 12(c) are diagrams corresponding to FIGS. 10(a), 10(c), and 10(e), respectively, schematically showing an eighth embodiment of the present invention.

In the above-described sixth embodiment shown in FIGS. 10(a) to 10(e), the buckle 2 is linearly moved to the storage position, the attachment position, or the use position using the pinion 14, the rack 16 provided on the supporting lever 3, the lock member 19 having the notch 19a and the rack 19b, the lock-member-driving motor 26, the rotating shaft 20 of the motor 26, and the lock-member-driving pinion 21, by rotating the pinion 14 together with the rotating shaft 5a of the motor 5. In addition, the buckle 2 is locked at the use position by the lock member 19. In comparison, as shown in FIGS. 12(a) to 12(c), in a buckle device 1 according to the eighth embodiment, a motor 5, an expansion/contraction thread mechanism 9, and a guiding/restraining member 15 similar to those of the above-described seventh embodiment shown in FIGS. 11(a) and 11(b) are provided in place of the pinion 14, the rack 16, the lock member 19, the lock-member-driving motor 26, the rotating shaft 20, and the lock-member-driving pinion 21.

Similar to the above-described sixth embodiment, also in the buckle device 1 according to the eighth embodiment, a storage position shown in FIG. 12(a) at which a buckle 2 is hidden in a vehicle rear seat 6, an attachment position shown in FIG. 12(b) at which the buckle 2 projects out from the vehicle rear seat 6 and a seat belt is fastened by inserting a tongue 13 into the buckle 2, and a use position (lock position) shown in FIG. 12(c) at which the buckle 2 projecting out from the vehicle rear seat 6 is locked and the seat belt is used.

In addition, when a force is applied to the buckle 2 as described above, the force is reliably received by the internal thread member 10 and the external thread member 11 via the supporting lever 3 and the internal thread member 10.

Other structures, operations, and effects obtained by the buckle device 1 according to the eighth embodiment are substantially similar to those described in the sixth embodiment, and effects obtained by a seat belt apparatus using the buckle device 1 according to the eighth embodiment are similar to those described in the first embodiment.

In the above-described sixth and eighth embodiments, the buckle 2 is linearly moved between the storage position, the attachment position, and the use position. However, similar to the first and fourth embodiments, the buckle 2 may also be rotated between the storage position, the attachment position, and the use position. In the above-described embodiments, the buckle 2 is either linearly moved or rotated. However, the buckle 2 may also be moved with a combination of linear and rotational movements.

In addition, in the above-described embodiments, the belt-withdrawal detection sensor 23 is used as the belt-fastenable-state detecting device, and the belt-withdrawal detection signal output from the belt-withdrawal detection sensor 23 is used as a trigger signal for moving the buckle 2 from the storage position to the use position. However, other detection signals which represent the state in which the occupant is seated and the seat belt can be fastened, for example, a seated-state detection signal obtained by a seated-state detection sensor which detects the state in which the occupant is sitting on the vehicle rear seat 6, may also be used instead of the belt-withdrawal detection sensor 23.

In addition, although the buckle switch 24 is used as the removable-state detecting device and the separation detection signal output from the buckle switch 24 is used as a trigger signal for moving the buckle 2 from the use position to the storage position, other detection signals which represent the state in which the occupant can get off the vehicle rear seat 6, for example, a belt-retraction detection signal obtained by a belt-retraction detection sensor which detects the state in which the seat belt is entirely retracted by a retractor after the tongue 13 is separated from the buckle 2, may also be used instead of the buckle switch 24.

In addition, in the above-described embodiments, the buckle device 1 is applied to a vehicle rear seat. However, the buckle device 1 according to the present invention may also be applied to a vehicle front seat. In such a case, the buckle device 1 is disposed on a side of the vehicle front seat and is not hidden in the vehicle front seat. Accordingly, effects substantially similar to those obtained by the above-described embodiments can be obtained except the effect that the appearance of the vehicle is improved.

The priority applications, Japanese Patent Application No. 2004-78751 filed on Mar. 18, 2004, Japanese Patent Application No. 2004-129337 filed on Apr. 26, 2004, and Japanese Patent Application No. 2005-3530 filed on Jan. 11, 2005 are hereby incorporated by reference herein in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A buckle device comprising:
   a buckle with which a tongue supported by a seat belt becomes engaged, and
   a buckle-moving device which moves the buckle between a storage position at which the buckle is stored when the buckle is not used and a use position at which the buckle is retained in a used state in which the seat belt is fastened, wherein the buckle is configured to be hidden in a vehicle seat at the storage position, and to project out from the vehicle seat at the use position, wherein the buckle device further comprises a buckle-supporting lever that is adapted to support the buckle, wherein the buckle-supporting lever comprises two levers, wherein each of the two levers comprise a plurality of holes and wherein the two levers are joined together by engaging members configured to reduce an external force applied to a portion of the buckle-supporting lever if the external force is larger than a predetermined force and to permit the two levers to move relative to one another when the external force is larger than the predetermined force; and wherein the engaging members are urged between the two levers so that the engaging members are at least partially inserted in the holes of the two levers, wherein the engaging members are configured to move from the holes of at least one of the two levers when the external force is larger than the predetermined force.

2. The buckle device according to claim 1, wherein the buckle-moving device is adapted to move the buckle between the storage position and the use position with a rotational movement.

3. The buckle device according to claim 1, wherein the buckle-moving device includes a motor.

4. The buckle device according to claim 3, wherein the motor is adapted to move the buckle from the storage position to the use position when a withdrawal of the seat belt is detected or a state in which an occupant is sitting on the vehicle seat is detected.

5. The buckle device according to claim 3, wherein the motor is adapted to move the buckle from the use position to the storage position when a separation of a tongue from the buckle is detected.

* * * * *